United States Patent [19]
Parker et al.

[11] Patent Number: 5,111,310
[45] Date of Patent: May 5, 1992

[54] METHOD AND APPARATUS FOR HALFTONE RENDERING OF A GRAY SCALE IMAGE USING A BLUE NOISE MASK

[75] Inventors: Kevin J. Parker; Theophano Mitsa, both of Rochester, N.Y.

[73] Assignee: Research Technologies Corporation, Inc., Tucson, Ariz.

[21] Appl. No.: 622,056

[22] Filed: Dec. 4, 1990

[51] Int. Cl.$^5$ .............................................. H04N 1/40
[52] U.S. Cl. ...................................... 358/456; 358/457
[58] Field of Search .................... 358/465, 456–458, 358/463, 464

[56] References Cited

U.S. PATENT DOCUMENTS

| | | | |
|---|---|---|---|
| 4,425,642 | 1/1984 | Moses et al. | 370/76 |
| 4,698,691 | 10/1987 | Suzuki et al. | 358/283 |
| 4,736,254 | 4/1988 | Kotera et al. | 358/283 |
| 4,800,442 | 1/1989 | Riseman et al. | 358/280 |
| 4,819,075 | 4/1989 | Imaide et al. | 358/213.18 |
| 4,912,569 | 3/1990 | Petilli | 358/465 |
| 4,920,501 | 4/1990 | Sullivan et al. | 364/518 |

OTHER PUBLICATIONS

"Dithering with Blue Noise", Robert A. Ulichney, *Proceedings of the IEEE*, vol. 76, No. 1, Jan. 1988, pp. 56–79.

*Primary Examiner*—Stephen Brinich
*Attorney, Agent, or Firm*—Dickstein, Shapiro & Morin

[57] ABSTRACT

A method of and system for rendering a halftone image of a gray scale image by utilizing a pixel-by-pixel comparison of the gray scale image against a blue noise mask is disclosed in which the gray scale image is scanned on a pixel-by-pixel basis and compared on a pixel-by-pixel basis to an array of corresponding data points contained in a blue noise mask stored in a PROM or computer memory in order to produce the desired halftoned image. Both digital and optically implemented halftone methods are disclosed.

15 Claims, 5 Drawing Sheets

METHOD AND APPARATUS FOR HALFTONE RENDERING OF A GRAY SCALE IMAGE USING A BLUE NOISE MASK

BACKGROUND OF THE INVENTION

The present invention relates generally to the halftoning of images. More particularly, the present invention relates to a method of and system for rendering a halftone by utilizing a pixel-by-pixel comparison of the gray scale image against a blue noise mask.

Many printing devices are not capable of reproducing gray scale images because they are bi-level. As a result, the binary representation of a gray scale image is a necessity in a wide range of applications such as laser printers, facsimile machines, lithography (newspaper printing), liquid crystal displays and plasma panels. Gray scale images are typically converted to binary images using halftone techniques. Halftoning renders the illusion of various shades of gray by using only two levels, black and white, and can be implemented either digitally (facsimile machines, laser printers) or optically (newspaper printing).

Halftoning algorithms are classified into point and neighborhood algorithms according to the number of points from the input gray scale image required to calculate one output point in the output binary image. In the case of digital halftoning, points correspond to pixels. In point algorithms, the halftoning is accomplished by a simple pointwise comparison of the gray scale image against a nonimage, usually aperiodic (but not always) array or mask. For every point in the input image, depending on which point value (the gray scale image or the mask) is larger, either a 1 or 0 is placed respectively at the corresponding location in the binary output image. Halftoning using neighborhood algorithms is not done by simple pointwise comparison, but usually requires filtering operations that involve a number of points from the input gray scale image in order to calculate one point in the output image.

At present, given the existing halftoning algorithms, the choice for a specific halftoning algorithm depends on the target device and always requires a trade-off between image quality and speed. Neighborhood halftoning algorithms result in a good image quality (although the image is not completely artifact free), but they are slow and cannot be optically implemented. That leaves point algorithms as the only choice for optical applications such as newspaper printing. Point algorithms are fast and are suitable for all target devices, but the output usually suffers from artifacts such as periodic artifacts and false contours.

The halftoning system disclosed herein utilizes a point algorithm, and combines the output image quality of neighborhood algorithms with the speed and wide application range of point algorithms. A point algorithm is utilized and the halftoning is achieved by a pixelwise comparison against a nonimage array, called the "blue noise" mask.

The digital halftoning of images with multiple levels, such as gray scale levels, is known in the art. Two major techniques are currently in use. They are the ordered dither and the error diffusion methods. See *Digital Halftoning* by R. Ulichney, MIT Press, Cambridge, Mass. (1987). See also R. W. Floyd and L. Steinberg, "Adaptive algorithm for spatial gray scale", SID International Symposium Digest of Technical Papers, pps. 36-37.

The Floyd and Steinberg paper is directed to the digital halftoning of a gray scale.

The major ordered dither techniques are the clustered-dot dither and dispersed-dot dither techniques. A white noise random dither technique is seldom utilized because it produces the poorest quality image and, of the other two dither techniques, clustered-dot is by far the most used. Both of those techniques are based upon a threshold screen pattern that is of a fixed size. For example, $6 \times 6$ threshold screens may be compared with the digital input values. If the input digital value is greater than the screen pattern number, a 1 is produced and, if it is less, a 0 value is assigned. A number of levels that can be represented using either technique depends on the size of the screen. For example, a $6 \times 6$ screen can produce 36 unique levels.

More levels can be achieved with larger patterns, however, a reduction in the effective resolution occurs because of the ability to transition among levels is at a coarser pitch. At the pixel rate of about 300 to 500 per inch, which is the average pixel rate of copiers and laser printers, the pattern artifacts are visible for screen patterns larger than $4 \times 4$, and, since 16 levels do not provide an adequate precision for typical continuous-tone imagery, a suboptimal resolution is usually obtained.

One solution to such a problem is disclosed by Ulichney in a paper "Dithering with Blue Noise" published in the Proceedings of the IEEE, Vol. 76, No. 1, January 1988. In that article, a method of spatial dithering is described which renders the illusion of continuous-tone pictures on displays that are capable of only producing binary picture elements. The method produces a blue noise pattern high frequency white noise from a filter to provide desirable properties for halftoning. More specifically, Ulichney uses perturbed-weight error diffusion methods which when digitally implemented run at a much slower speed (approximately 100 times slower) than is attainable with the present invention.

Error diffusion techniques, such as that disclosed in the Ulichney IEEE article, are fundamentally different from ordered dither techniques in that there is no fixed screen pattern. Rather, a recursive algorithm is used that attempts to correct errors made by representing the continuous signal by binary values.

The error diffusion method described by Ulichney, and others, such as Floyd and Steinberg, also has the disadvantage that it requires scanning, convolution-style calculations and, although it can be implemented for use with copiers, facsimile machines, etc., requires local calculations. It cannot, however, be optically implemented. In addition, all error diffusion techniques, including those described by Ulichney and Floyd and Steinberg, show scanning and start-up artifacts, which are not present in the instant invention. Also, while Ulichney describes a method that produces blue noise, the blue noise patterns produced by the present invention are more isotropic than those produced by Ulichney or other error diffusion methods. Utilizing ordered dither methods produces notably periodic patterns that are even much more obtrusive than those produced by error diffusion methods.

In some prior art systems, all dot profiles corresponding to different gray levels were derived independently, as if each grade level was its own special case. Thus, for example, in U.S. Pat. No. 4,920,501, to Sullivan et al., many individual dot profiles, corresponding to the desired number of gray levels, must be stored. In the present invention, on the other hand, dot profiles are built "on top of" the profiles from lower gray levels, such that a single valued 2-dimensional function, that is, the cumulative array or blue noise mask, can be constructed. When that single valued function is thresholded at any level, the resulting binary pattern is exactly the blue noise dot profile design for that particular gray level, p(i,j,g), where p can be one or zero corresponding to black or white, i and j are coordinates of pixels, and g represents a gray level $0 < g < 1$.

Another drawback to prior art methods is that the dot profile for a given gray level was designed to have blue noise properties by indirect methods, such as using an error diffusion filter with perturbed weights (Ulichney) or by a "simulated annealing" algorithm, as in U.S. Pat. No. 4,920,501. The method disclosed herein is advantageous with respect to the prior art in that the desired blue noise power spectrum is produced through the use of a filter on the dot profile and is implemented directly in the transform domain. Such filtering results in a nearly ideal blue noise pattern with implicit longscale periodicity because of the circular convolution implicit in the use of discrete Fourier transforms. However, the filtered pattern is no longer binary. Thus, a minimization of error approach is utilized in which the largest differences between the ideal, filtered, blue noise pattern and the unfiltered dot profile are identified. The magnitude and location of those differences indicate the pixels in which ones and zeros could be changed to produce a more ideal blue noise dot profile.

SUMMARY AND OBJECTS OF THE INVENTION

In view of the foregoing, it should be apparent that there still exists a need in the art for a method of and apparatus for the halftone rendering of gray scale images in which a digital data processor is utilized in a simple and precise manner to accomplish the halftone rendering to provide a pleasing gray scale image which is characterized by the pixelwise comparison of the image being analyzed against a blue noise mask.

More particularly, it is an object of this invention to provide a system for the halftone rendering of a gray scale image which has a simple and reliable mechanism for producing the desired image.

Still more particularly, it is an object of this invention to provide a system for the halftone rendering of a gray scale image which can be implemented either digitally or optically.

Briefly described, these and other objects of the invention are accomplished by generating a blue noise mask which, when thresholded at any gray level g, produces a blue noise binary pattern appropriate for that gray level. After the blue noise mask has been generated, it is stored in a PROM. The image to be halftoned is then read by a scanner on a pixel-by-pixel basis and compared to the corresponding stored pixel in the blue noise mask to produce the resulting binary array. The binary image array is then converted to a binary display which is the resultant halftoned image.

In an optical implementation, the gray scale image is photographed through the generated blue noise mask and the resultant superposition is printed onto a high contrast film. An additive photographic process may also be utilized in which the blue noise mask is added to the gray scale image at the film plane, for example, by a double exposure process. The photographic blue noise mask can be obtained from a calculated blue noise array using a film printer interfaced to the PROM or computer in which the blue noise mask array is stored.

DETAILED DESCRIPTION OF THE PREFERRED EMBODIMENT

Figure 1:
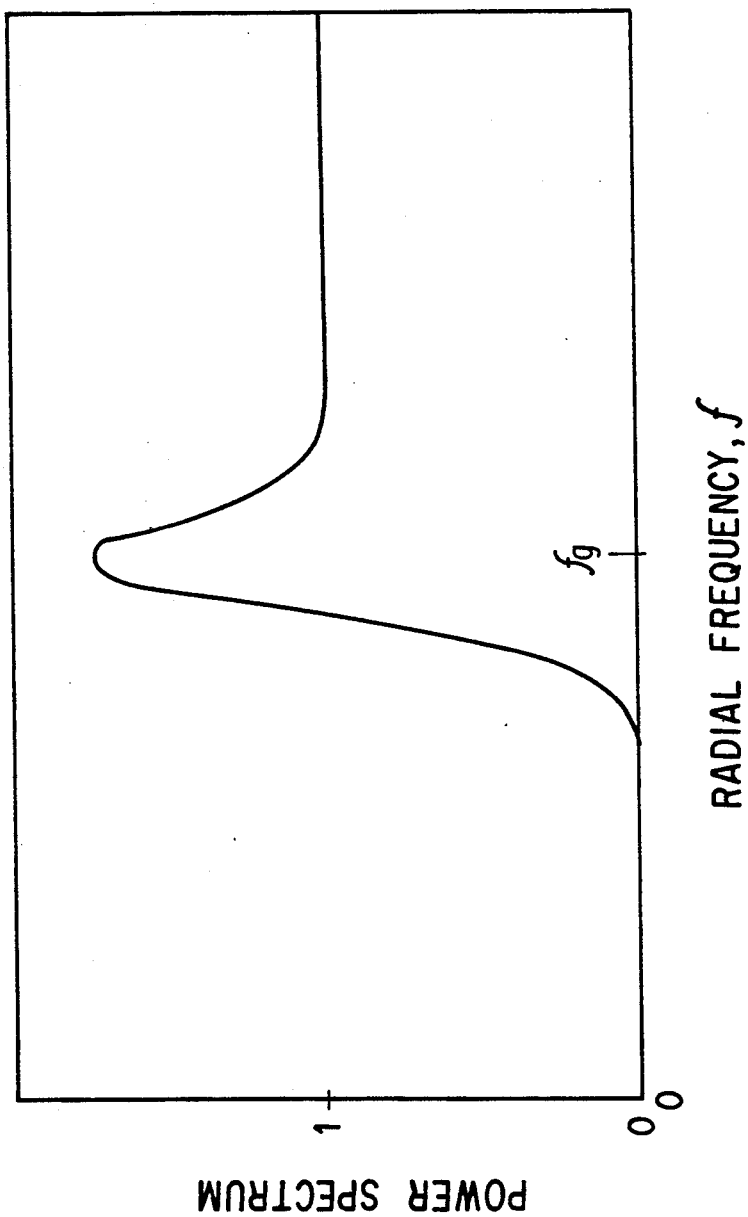
FIG. 1 is a drawing showing the power spectrum of a blue noise pattern formed in accordance with the present invention.

Prior to referring to the drawings, the following description of the theoretical underpinnings of the present invention is provided.

As described above, the present invention is a halftone rendering system which accomplishes its function by a pixel-by-pixel comparison of a gray scale image against a "blue noise" mask. As referred to herein, the term "blue noise" is a pattern with negligible low frequency components which possesses certain visually pleasing properties, as described by R. Ulichney in his book, *Digital Halftoning*.

In the present invention, depending upon which pixel is larger, either the gray scale image or the blue noise mask, a 1 or a 0 is placed in the binary (black or white) image file which is the halfton rendered version of the gray scale image. Using the notation that the gray scale image is $M \times N$ pixels in size and B-bits of gray per pixel, the blue noise mask can be a smaller array $J \times K$ in size where J is less than or equal to M and K is less than or equal to N with only $B-1$ bits per pixel.

The blue noise mask described herein is constructed to have unique first and second order properties. When thresholded at any level, for example at A% of the maximum level, exactly A out of every 100 pixels will be greater than the threshold value. In addition, the spatial distribution of the pixels above the threshold is arranged in such a manner as to form a blue noise pattern which has been shown to be visually pleasing.

The disclosed blue noise mask, therefore, has the characteristic that the first order statistics are uniformly distributed over gray levels. That is, when the blue noise mask is thresholded at a gray level g, exactly $g \times 100\%$ of all values are below the threshold. For $g = 0.5$, exactly 50% of the blue noise mask pixels are above, and 50% below the threshold value. The blue noise mask disclosed herein also has the characteristic that when thresholded at any level g, the resulting bit pattern has a power spectrum consistent with and approximating the ideal blue noise pattern for that threshold. In addition, since the blue noise image is constructed with explicit "wraparound" properties, a small blue noise pattern of J×K pixels can be used to halftone render a larger M×N pixel's image, because the pixel-by-pixel comparison can proceed modulo J and modulo K in the respective directions, with no apparent discontinuities or obvious periodicities. However, the value of (J×K) should not be smaller than X/2, where X is the number of levels of the original gray scale image.

It is also desirable to describe the digital halftoning system of the present invention for the analog case in which discrete space is replaced by continuous space. Using such notation, x and y represent continuous space, while i and j represent discrete space. Thus, the gray scale image is denoted by f(x,y), the blue noise mask is denoted by m(x,y) and the output (halftoned) binary image is denoted by h(x,y).

Thus, for a B-bit image array f(i,j), the blue noise mask array m(i,j) is a B-bit array such that, when thresholded against f(i,j), up to $2^B$ levels of varying distribution of black and white dots can be represented on a rectangular grid. Note that the dimensions of the blue noise mask can be smaller than those of the gray scale image and that the halftoning of the gray scale image is achieved by a periodic repetition of m(i,j) over the entire image plane. For example, for a 256×256 8-bit class of images, a 128×128 8-bit blue noise mask array can be used.

The binary pattern that results after thresholding the blue noise mask at a constant level g is called the dot profile for that level. The dot profiles are arrays that have the same dimensions as the mask array, and consist of ones and zeros. The ratio of ones to zeros is different for every dot profile and depends on the gray level that particular dot profile represents. In the notation used herein, the higher the gray level, the more ones and less zeros that will be contained in the dot profile. p(i,j,g) is used to denote the value of the dot profile at pixel location (i,j) and for the gray level g. g=0 is used to represent black and g=1 is used to represent white. Thus, $0 \leq g \leq 1$. Also, by denoting as $f_{i,j}$ the value of the discrete space function f(i,j) at pixel location (i,j), a N×N binary image h(x,y) can be written as following in terms of the dot profiles:

$$h(x,y) = \sum_{i=0}^{N/2-1} \sum_{j=0}^{N/2-1} p[m;n;f_{ij}]rect(x - mR)/Rrect(y - nR)/R \quad (1)$$

where R is the spacing between the addressable points on the display device, and rect(x)=1 if $|x| < \frac{1}{2}$ and rect(x)=0 otherwise. Therefore, for any gray scale image, the corresponding binary image h(x,y) can be constructed as follows in terms of the dot profiles: For every pixel in the gray scale image array f(i,j) that is at the (i,j) location and has a value $f_{i,j}$=g, the corresponding pixel in the binary image array h(i,j) has a value that is given by the value of the g-level dot profile at the (i,j) location.

The dot profiles for every level are designed and combined in such a way as to build a single valued function, the blue noise mask. The blue noise mask is constructed such that when thresholded at any level, the resulting dot profile is a locally aperiodic and isotropic binary pattern with small low-frequency components, which in the halftoning literature, is known as a blue noise pattern. Those dot profiles are not independent of each other, but the dot profile for level $g_1 + \Delta g$ is constructed from the dot profile for level $g_1$ by replacing some selected zeros with ones. For example, for a N×N B-bit mask array and maximum pixel value given by $2^B$. $\Delta g$ is given by $\Delta g = \frac{1}{2}^B$ and the number of zeros that will L change to ones, in order to go from level $g_1$ to level $g_1 + \Delta G$ is $N^2/2^B$.

As the dot profile is changed from its pattern at $g_1$ to $g_1 + \Delta g$, another array called the cumulative array is incremented in such a way as to keep track of the changes in dot profiles from gray level to gray level. That cumulative array (not a binary array but a B-bit array) becomes the blue noise mask because, when thresholded at any level g, the resulting binary pattern reproduces the dot profile for that level.

Referring now to the figures wherein like reference numerals are used throughout, there is shown in FIG. 1 a diagram of the power spectrum of a blue noise pattern which is free of a low frequency component and is radially symmetric. The absence of low frequency components in the frequency domain corresponds to the absence of disturbing artifacts in the spatial domain. Radial symmetry in the frequency domain corresponds to isotropy in the spatial domain. Isotropy, aperiodicity and the lack of lowfrequency artifacts are all desirable properties in halftoning because they lead to visually pleasing patterns.

As shown in FIG. 1, the cutoff frequency $f_g$, which is termed the Principal Frequency, depends as follows on the gray level g:

$$f_g = \begin{cases} \sqrt{g}/R & \text{for } g \leq \frac{1}{2} \\ \sqrt{1-g}/R & \text{for } g > \frac{1}{2} \end{cases} \quad (2)$$

where R, as before, is the distance between addressable points on the display and the gray level g is normalized between 0 and 1. As can be seen from the above equation, $f_g$ achieves its maximum value where $g = \frac{1}{2}$, since at that level the populations of black and white dots are equal and thus very high frequency components appear in the binary image.

Figure 2:
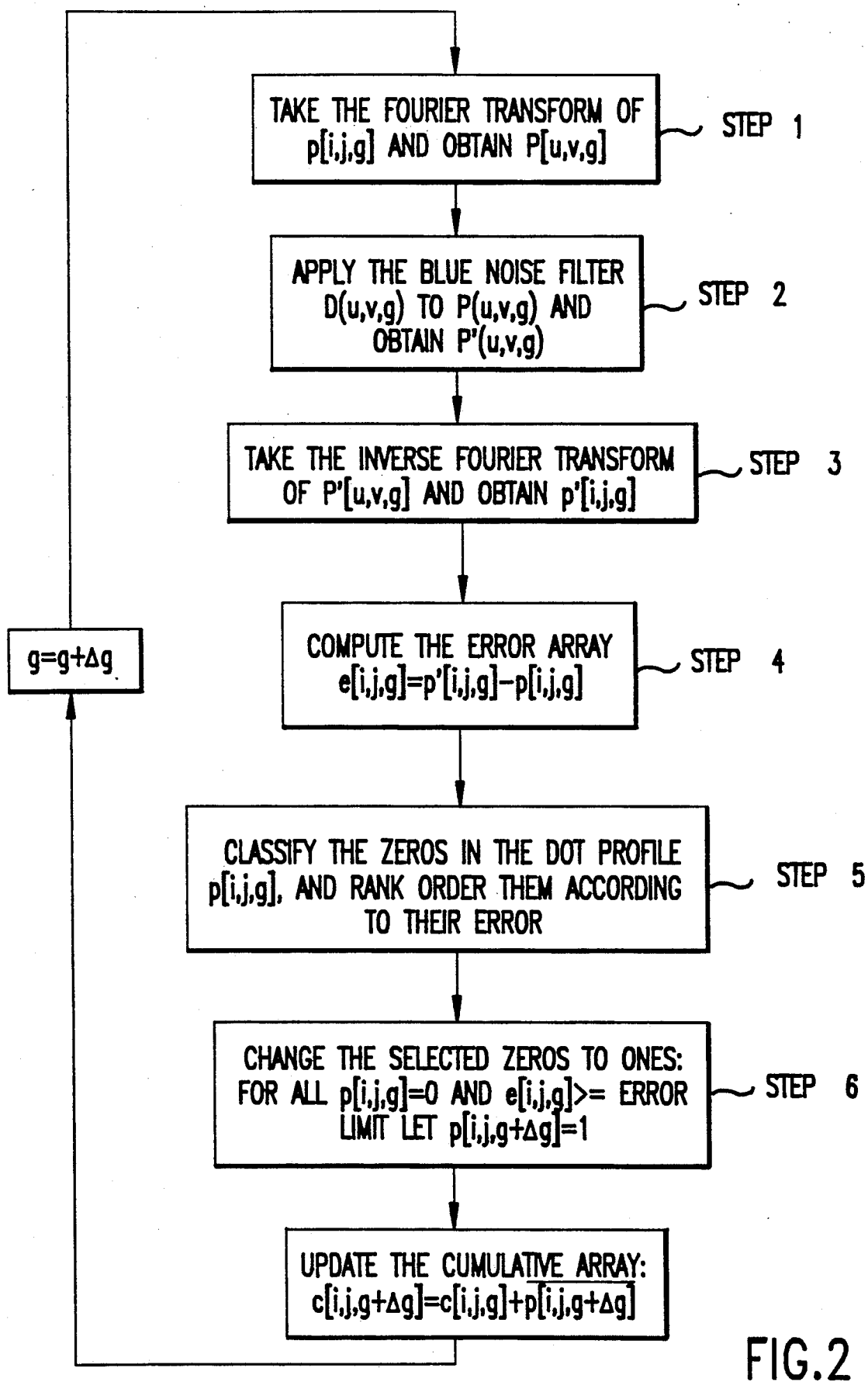
FIG. 2 is diagram of a flow chart for the design of the blue noise mask of the present invention.

For a N×N B-bit image with $2^B$ as the maximum pixel value, the blue noise mask is constructed as follows: First, the dot profile $p[i,j,\frac{1}{2}]$ that corresponds to the 50% gray level is created. That dot profile is generated from a white noise pattern after filtering it with a highpassed circularly symmetric filter and results in a binary pattern having visually annoying low frequency components. In order to give blue noise properties to the $p[i,j,\frac{1}{2}]$ dot profile, the following iteration procedure is utilized, as shown in FIG. 2, which is a flow chart showing the steps for designing a blue noise mask for generating level $g + \Delta g$ from level g. Step 1. Take the 2-dimensional Fourier transform of the dot profile $p[i,j,\frac{1}{2}]$ and obtain the dot profile $P[u,v,\frac{1}{2}]$, where u and v are the transformed coordinates, and P represents the power spectrum.

Step 2. Apply a blue noise filter $D(u,v,\frac{1}{2})$ to the spectrum $P[u,v,\frac{1}{2}]$ and in that way obtain the new spectrum $P'[u,v,\frac{1}{2}] = P[u,v,\frac{1}{2}] \times D(u,v,\frac{1}{2})$. The blue noise filter is designed to produce in the dot profile spectrum $P'[u,v,\frac{1}{2}]$ an average cross section along a radially symmetric line shown in FIG. 1. The principal frequency is given by $f_g = 1\sqrt{R}$.

Step 3. Take the Inverse Fourier transform of $P'[u,v,\frac{1}{2}]$ and obtain $p'[i,j,\frac{1}{2}]$, which is no longer binary but has much better blue noise properties.

Step 4. Form the difference $e[i,j,\frac{1}{2}] = p'[i,j,\frac{1}{2}] - p[i,j,\frac{1}{2}]$. That difference is referred to as the error array.

Step 5. Classify all pixels into two classes according to the value of $p[i,j,\frac{1}{2}]$ for each pixel; all the zeros belong in the first class and all the ones in the second. Then, rank order all the pixels in those two classes according to the value of $e[i,j,\frac{1}{2}]$ for each pixel.

Step 6. Set a limit, $l_{68} = \epsilon$, for the magnitude of the highest acceptable error. That limit is usually set equal to the average magnitude error. For the zeros, $l_{68} = \epsilon$ and for the ones, $l_{68} = \epsilon$. Change all the pixels that contain a zero and have an error higher than the defined limit to ones. Similarly, change all the pixels that contain a one and have an error smaller than the defined negative limit to zeros. The number of zeros that are changed to ones must be equal to the number of ones that are changed to zeros so that the total average is preserved. The initialization process is then complete.

The above procedure is then repeated until no pixels have an error higher than some predetermined error. Note that the magnitude of the average error becomes lower for both zeros and ones every time the procedure is repeated.

In order to finish the initialization procedure, refer to another N×N array, which is denoted as $c[i,j,\frac{1}{2}]$ and referred to as the cumulative array, and give a value of $2^{B-1}$ to every pixel whose corresponding pixel in the dot profile has a value of zero, and give a value of $2^{B-1} - 1$ otherwise. In that way, when the cumulative array, which eventually will become the blue noise mask, is thresholded at a 50% gray level, the resulting dot profile is equal to $p[i,j,\frac{1}{2}]$.

After having generated in the above fashion the dot profile for the $\frac{1}{2}$ gray level, the $\frac{1}{2} + \Delta g$ gray level is then constructed, where $\Delta g$ is usually taken as $\frac{1}{2}^B$, the quantization limit. In general $\Delta g \geq \frac{1}{2}^B$. The dot profile for the $\frac{1}{2} + \Delta g$ gray level is generated from the dot profile for the $\frac{1}{2}$ level by converting $N^2/2^B$ zeros to ones. The selection of the pixels that contain a zero and will be replaced by a one is done following a procedure similar to the one described previously for the design of the $\frac{1}{2}$ dot profile in FIG. 2.

In general, the dot profile for the $g + \Delta g$ level can be generated from the dot profile for the g level, as shown in FIG. 2. Up to Step 4, the procedure for the creation of the $g + \Delta g$ dot profile is exactly the same as the procedure for the creation of the initial dot profile for the $\frac{1}{2}$ level. It is important to note that in Step 2, the principal frequency of the blue noise filter is updated for every level according to equation (2). After Step 4, the purpose is to go up one gray level and thus only zeros are changed to ones. Using the error array, the pixels that contain a zero are classified in Step 5 and rank ordered, and then $N^2/2^B$ selected zeros are changed to ones in Step 6:

$$\forall p[i,j,g] = 0 \cap e[i,j,g] \geq l_{\epsilon} \rightarrow p[i,j,g + \Delta g] = 1; g > \frac{1}{2} \quad (3)$$

Every time a zero is changed to one, the statistics of its neighborhood change and therefore the information contained in the error array for its neighboring pixels may not be valid any more. For that reason, only a few zeros are replaced with ones and then the error array is recalculated or as an additional criteria is checked, such, as neighborhood mean and runlengths. Finally, the cumulative array is updated in Step 7 by adding one only to those pixels that still correspond to a zero in the dot profile $p[i,j,g + \Delta g]$:

$$c[i,j,g + \Delta g] = c[i,j,g] + \overline{p[i,j,g + \Delta g]}; g > \frac{1}{2} \quad (4)$$

where the bar indicates a logical "not" operation changing zeros to ones and vice versa.

In that fashion, when the blue noise mask is thresholded at constant level $g + \Delta g$, the resulting binary pattern is the dot profile $p[i,j,g + \Delta g]$. That procedure is repeated until the dot profiles for all the gray levels from $\frac{1}{2} + \Delta g$ up to 1 are created. The levels from $\frac{1}{2} - \Delta g$ to 0 are created in the same way with the only difference that the ones are changed to zeros and the cumulative array is updated as follows:

$$c[i,j,g - \Delta g] = c[i,j,g] - p[i,j,g - \Delta g]; g > \frac{1}{2} \quad (5)$$

When the process has been implemented for all gray levels g, the cumulative array contains the desired blue noise dot profile for all levels, and is therefore the desired blue noise mask.

Once the blue noise mask has been generated, as described in connection with FIGS. 1 and 2, it can be used in a halftoning process. Since halftoning using a blue noise mask is a point algorithm, it can therefore be implemented either digitally or optically.

Figure 3:
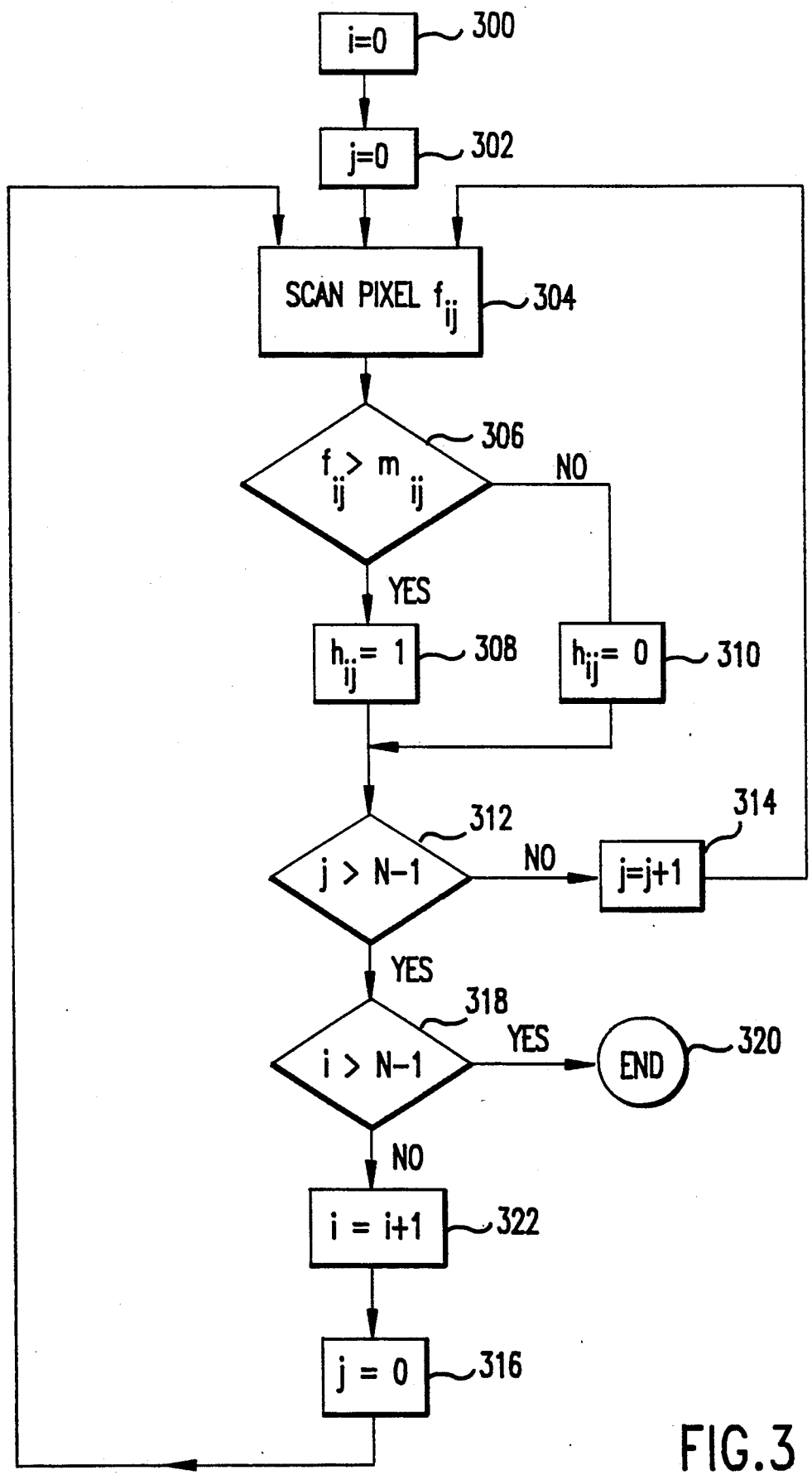
FIG. 3 is a diagram of a flow chart for the digital implementation of halftoning using a blue noise mask in accordance with the present invention.

A flow chart depicting the digital implementation of halftoning using a blue noise mask according to the present invention is shown in FIG. 3. In digital applications such as facsimile machines and laser printers, the instant method requires much less memory and/or computation than do other blue-noise-producing techniques such as error diffusion taught by Ulichney and by Sullivan et al. in U.S. Pat. No. 4,920,501, issued Apr. 24, 1990.

Figure 4:
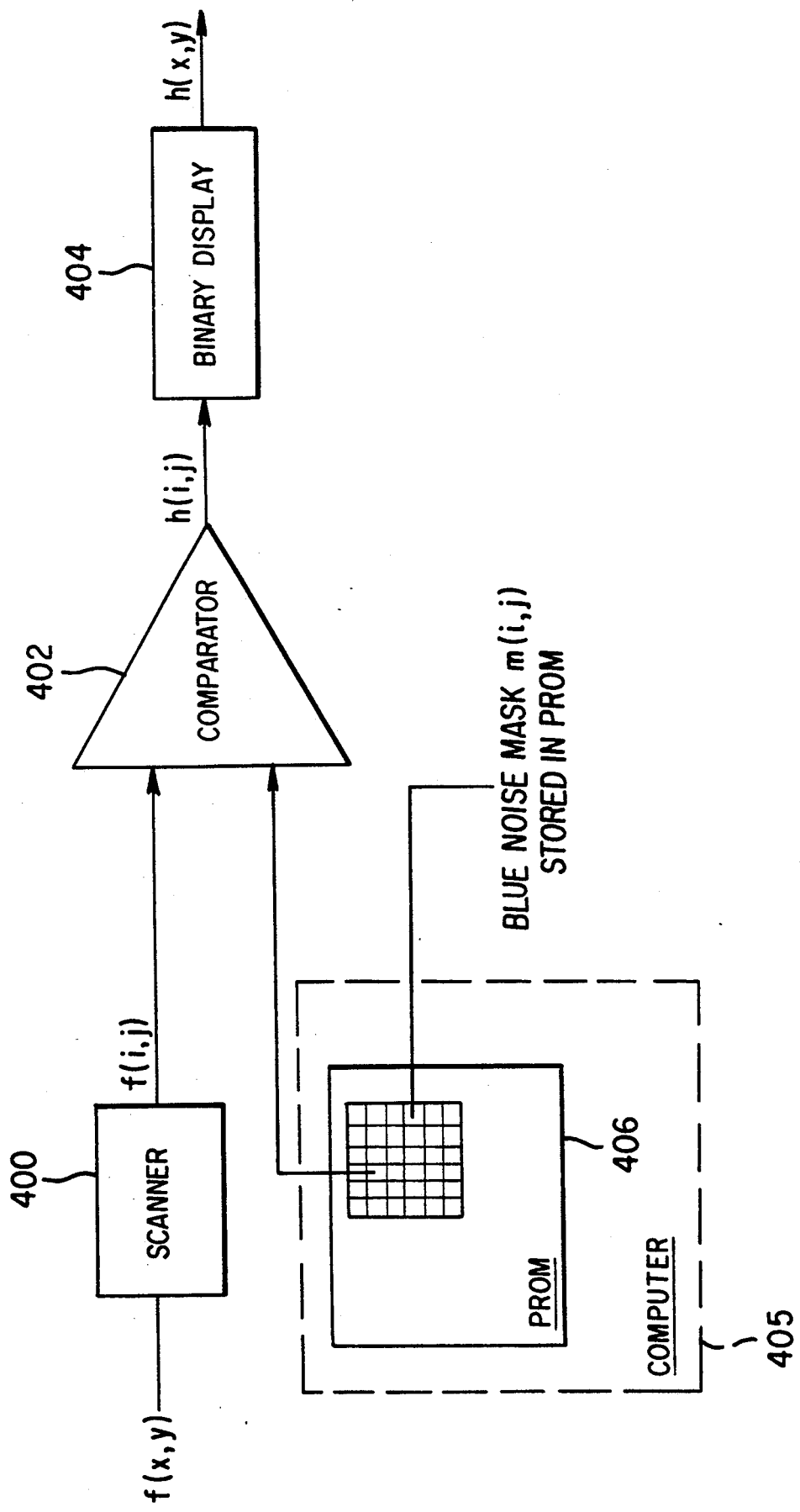
FIG. 4 is a schematic block diagram of a hardware system for digitally implementing halftoning using the blue noise mask in accordance with the present invention.

The necessary memory needed to store the blue noise mask array is stored on a PROM, as shown in FIG. 4. Then, the halftoning of a N×N gray scale image array f(i,j) against the blue noise mask array m(i,j) is implemented as follows: The i and j variables are first set to 0 at steps 300 and 302, respectively. The next pixel $f_{i,j}$ is then scanned at step 304. A determination is made at step 306 to determine if the value of that pixel $f_{i,j}$ is greater than the value of the corresponding element in the blue mask array $m_{i,j}$.

If it is determined at step 306 that the value of the gray scale image array pixel is greater than the value of the blue noise mask array pixel, then the value of the resulting array $h_{i,j}$ is set equal to 0 at step 310.

If an affirmative determination is made at step 306, then the value of the resulting array element $h_{i,j}$ is set equal to 1 at step 308. After steps 308 and 310, a determination is then made at step 312 of whether j is greater than N−1. That indicates the end of a row or column. If a negative determination is made at step 312, then j is set equal to j+1 at step 314 and the program then returns to step 304 to scan the next pixel.

If an affirmative determination is made at step 312, that indicates that the end of the scanned line has been reached. Then, the instant method is applied to the first pixels (j=0) of the next line. A determination is then made at step 318 of whether i is greater than N−1. If an affirmative determination is made at step 318, that indicates that the end of the image has been reached, and the program then ends at 320.

If a negative determination is made at step 318, that indicates that the end of the image may not have been reached and that additional pixels remain. Thus, the next line is scanned. The value of i is then set equal to i+1 at step 322, the value j is set equal to zero at step 316 and then the next pixel is scanned at step 304.

FIG. 4 shows an example of the hardware which may used for the digital implementation of halftoning using a blue noise mask as discussed in the instant application. It should be understood that the hardware implementation can be either digital or analog, for example, using an operational amplifier in place of the comparator 402 in the analog case. It is a significant advantage of digital halftoning using a blue noise mask that it is much faster than the other known blue noise producing techniques, because the halftoning is done by a simple pixelwise comparison. The digital halftoning using a blue noise mask process of the present invention can be speeded up even further by performing the comparison step in parallel, since all of the thresholds are preassigned.

As shown in FIG. 4, a scanner 400 is used to scan an image and convert the pixels on that image from an array of f(x,y) to the gray scale image array f(i,j). The output from the scanner 400 is fed to a first input of the comparator 402.

As previously described, the blue noise mask array m(i,j) is stored in the PROM 406 which may be located in a computer 405. The output from the PROM 406 is fed to the second input of the comparator 402. The output of the comparator is the binary image array h(i,j) which is fed to a binary display 404 which converts that array into the final image array h(x,y).

As previously discussed, the present halftoning using a blue noise mask invention can also be implemented in an optical or photographic manner. An example of an optical application of the present halftoning system is the photographic process used in newspaper printing. Such a process can be either multiplicative or additive.

Figure 5:
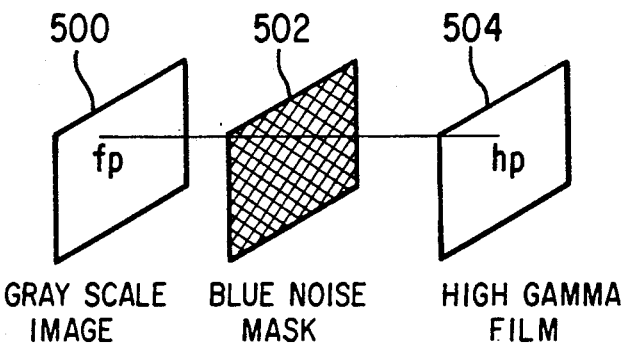
FIG. 5 is a drawing of a multiplicative photographic process utilized for optically implementing halftoning using a blue noise mask in accordance with the present invention.

In the multiplicative photographic process, the gray scale image f(x,y) 500 is photographed through the blue noise mask 502 which has a transmittance m(x,y) and the resultant superposition h(x,y)=f(x,y) × m(x,y) is printed onto high contrast film 504, such as high gamma film. That procedure is shown in FIG. 5. It should be understood that a point $f_p$ in the array f(x,y) corresponds to a dot $h_p$ in the array h(x,y), whose size and shape depends on the gray level that $f_p$ represents.

Figure 6:
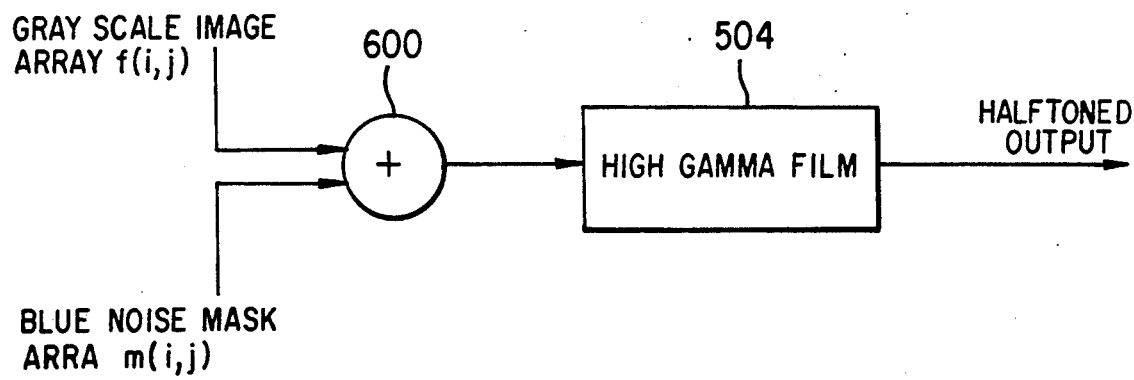
FIG. 6 is a drawing of an additive photographic process which may be utilized in the optical implementation of halftoning using a blue noise mask in connection with the process shown in FIG. 5.

FIG. 6 shows the additive photographic process in which the blue noise mask is added to the gray scale image at the film plane by a double exposure. The gray scale image array and blue noise mask array are added by adder 600 and then fed to the high gamma film 504 which produces the halftoned output. The adder 600 is in simplest form a repeated exposure of the film 504, where the image and the blue noise mask are exposed separately onto the film 504, which is then developed.

In general, a gray scale photographic blue noise mask m(x,y) can be obtained from a calculated array m(i,j) using a film printer such as a Dunn camera interfaced to a PROM or a computer. The conversion from discrete points to a continuous image is then given by equation (1). Print film or transparency film is exposed by the computer controlled film printer so as to produce a photographic blue noise mask.

The blue noise mask can also be used for halftoning in applications that involve multibit and color displays. The digital halftoning process for a binary display using a blue noise mask (FIG. 2) can also be expressed as follows:

$$h(i,j) = \text{int}\{m(i,j) + f(i,j)\} \tag{6}$$

wherein int denotes integer truncation and the gray levels of m(i,j) and f(i,j) vary between 0 and 1. In general, for a K-bit display, the output image array h(i,j) can be written as follows:

$$h_K(i,j) = \frac{1}{2^K - 1} \text{int}\{(2^K - 1)m(i,j) + f(i,j)\} \tag{7}$$

The $2^K - 1$ threshold values are equally spaced between 0 and 1. A non-uniform quantizer is also possible.

The instant method can also be applied to color halftoning, by independently thresholding each one of the component colors against the blue noise mask and then overprinting.

Although only a preferred embodiment is specifically illustrated and described herein, it will be readily appreciated that many modifications and variations of the present invention are possible in light of the above teachings and within the purview of the appended claims without departing from the spirit and intended scope of the invention.

What is claimed is:

1. A method for the halftoning of gray scale images by utilizing a pixel-by-pixel comparison of the image against a blue noise mask in which the blue noise mask is comprised of a random non-deterministic, non-white noise single valued function which is designed to produce visually pleasing dot profiles when thresholded at any level of said gray scale images.

2. The method of claim 1, wherein said blue noise mask is used to halftone a color image.

3. The method of claim 1, wherein said blue noise mask is used to halftone multibit displays.

4. The method of claim 1, wherein said blue noise mask is comprised of a continuous, single valued aperiodic blue noise function.

5. The method of claim 4, wherein said blue noise function is a random function and in which, when said blue noise mask is thresholded at any level, a dot profile with desirable blue noise characteristics is produced.

6. The method of claim 1, wherein said blue noise mask is formed by an at least one dimensional function having predetermined properties of a thresholded dot profile using transform domain filtering and error criteria.

7. The method of claim 6, wherein said blue noise mask is formed by an at least one dimensional function using spatial domain filtering and error criteria equivalent to said transform domain filtering and error criteria.

8. A method for constructing a blue noise mask using a blue noise power spectrum for use for the halftoning of gray scale images by utilizing a pixel-by-pixel comparison of said images against said blue noise mask in which said blue noise mask is constructed by incrementally building up dot profiles over increments in gray level and in which said dot profile at each level is constrained by the dot profile at the previous level and by requiring the matching of each dot profile to said blue noise power spectrum predetermined for that gray level.

9. The method of claim 8, wherein said blue noise power spectrum is modified by human visual response to produce an appropriately pleasing pattern.

10. A method for the halftoning of gray scale images by utilizing an optical blue noise mask in which said gray scale image is photographed through said blue noise mask and is printed onto high contrast film.

11. The method of claim 10, wherein said optical blue noise mask and said image are separately photographed onto said high contrast film such that a repeated exposure of said film occurs.

12. The method of claim 10, wherein said blue noise mask is formed using a film printer interfaced to a computer containing blue noise mask data.

13. A method of halftoning a gray scale image by utilizing a pixel-by-pixel comparison of said image against a blue noise mask array stored in a first memory, comprising the steps of:
  a) scanning said gray scale image to be halftoned to create a gray scale image array on a pixel-by-pixel basis;
  b) storing said gray scale image array in a second memory;
  c) comparing, on a pixel-by-pixel basis, the value of each corresponding pixel in said blue noise mask array and said gray scale image array to produce a binary image array; and
  d) converting said binary image array to the desired halftoned image.

14. The method of claim 13, wherein said gray scale image array created by said scanning step is fed directly to a computer for performing said comparing step.

15. The method of claim 13, wherein said image is a color image.

* * * * *

UNITED STATES PATENT AND TRADEMARK OFFICE
CERTIFICATE OF CORRECTION

PATENT NO. : 5,111,310
DATED : May 5, 1992
INVENTOR(S) : Parker et al.

It is certified that error appears in the above-indentified patent and that said Letters Patent is hereby corrected as shown below:

At column 4, line 42, replace "halfton" with --halftone--.

At column 5, lines 42-46 should read:

$$h(x,y) = \sum_{i=0}^{\frac{N}{2}-1} \sum_{j=0}^{\frac{N}{2}-1} p[m;n;f_{ij}] \; rect(\frac{x-mR}{R}) \; rect(\frac{y-nR}{R}) \qquad (1)$$

At column 6, line 65, replace "  " with -- $f_g = (1/\sqrt{2})R$ --.

At column 8, line 43, replace "greater" with --less--.

Signed and Sealed this

Thirteenth Day of June, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,111,310
DATED : May 5, 1992
INVENTOR(S) : Kevin J. Parker et al.

It is certified that error appears in the above-identified patent and that said Letters Patent is hereby corrected as shown below:

Column 6,
Line 57, replace "power spectrum" with -- Fourier transform --.

Signed and Sealed this

First Day of November, 2005

JON W. DUDAS
*Director of the United States Patent and Trademark Office*